March 19, 1957 L. F. THIRY 2,785,458
APPARATUS FOR MAKING PRECISION ANTIVIBRATION MOUNTINGS
Original Filed Dec. 3, 1943 3 Sheets-Sheet 1
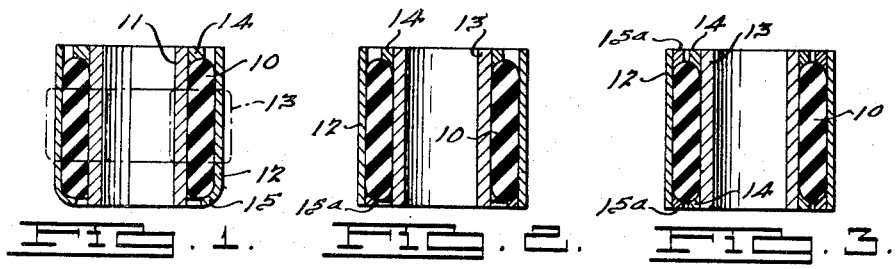
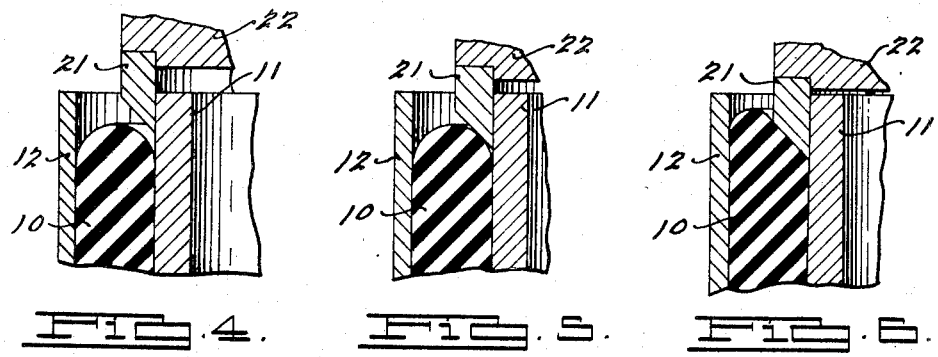
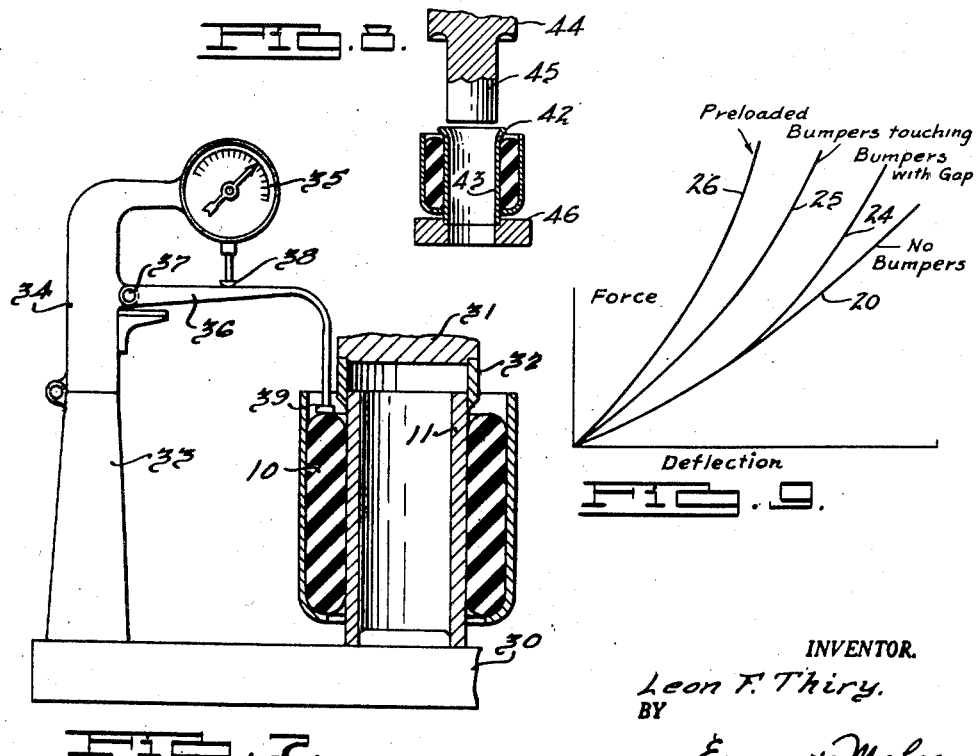
INVENTOR.
Leon F. Thiry.
BY
Evans + McCoy
ATTORNEYS.

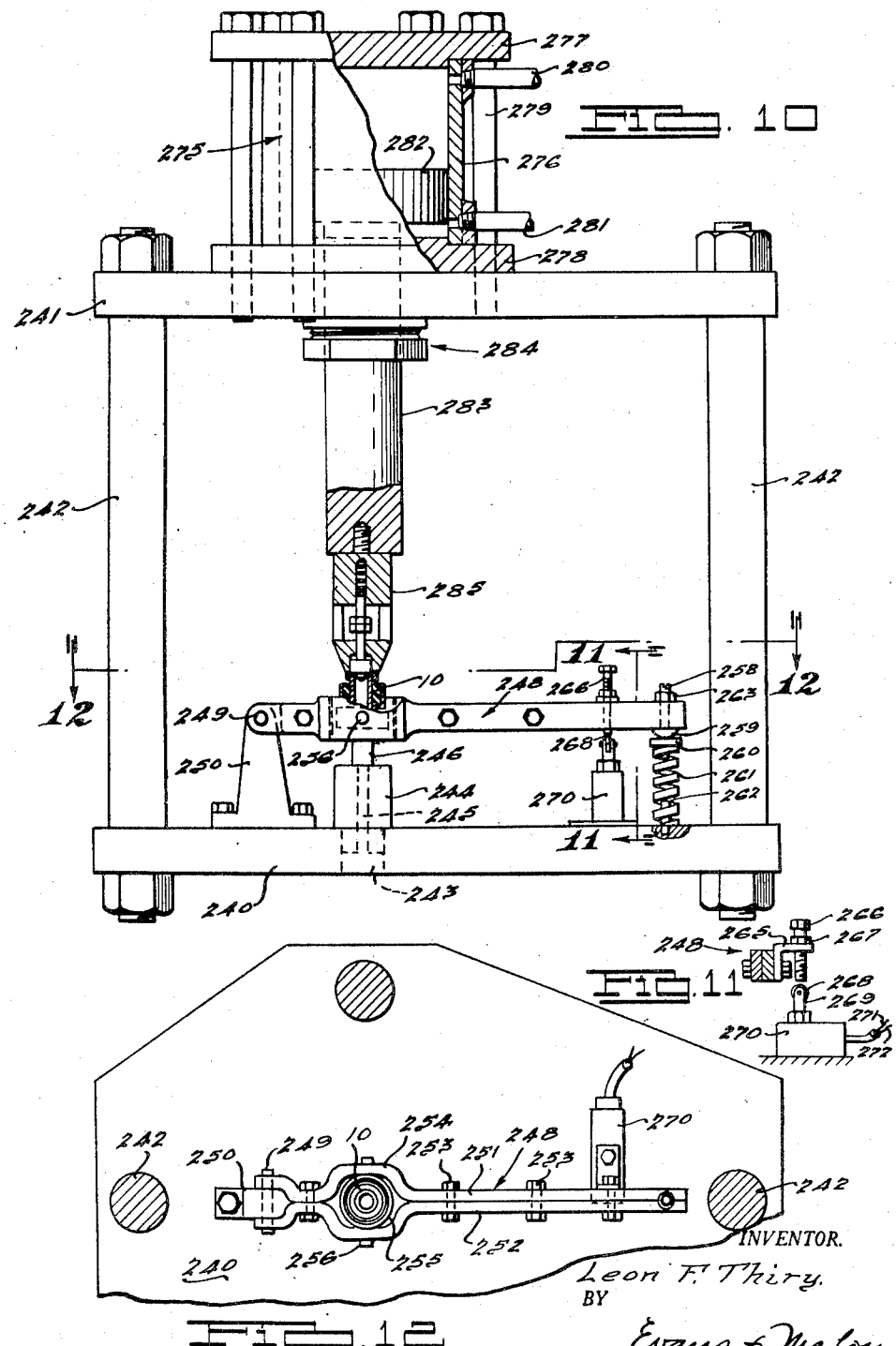

March 19, 1957 L. F. THIRY 2,785,458
APPARATUS FOR MAKING PRECISION ANTIVIBRATION MOUNTINGS
Original Filed Dec. 3, 1943 3 Sheets-Sheet 3
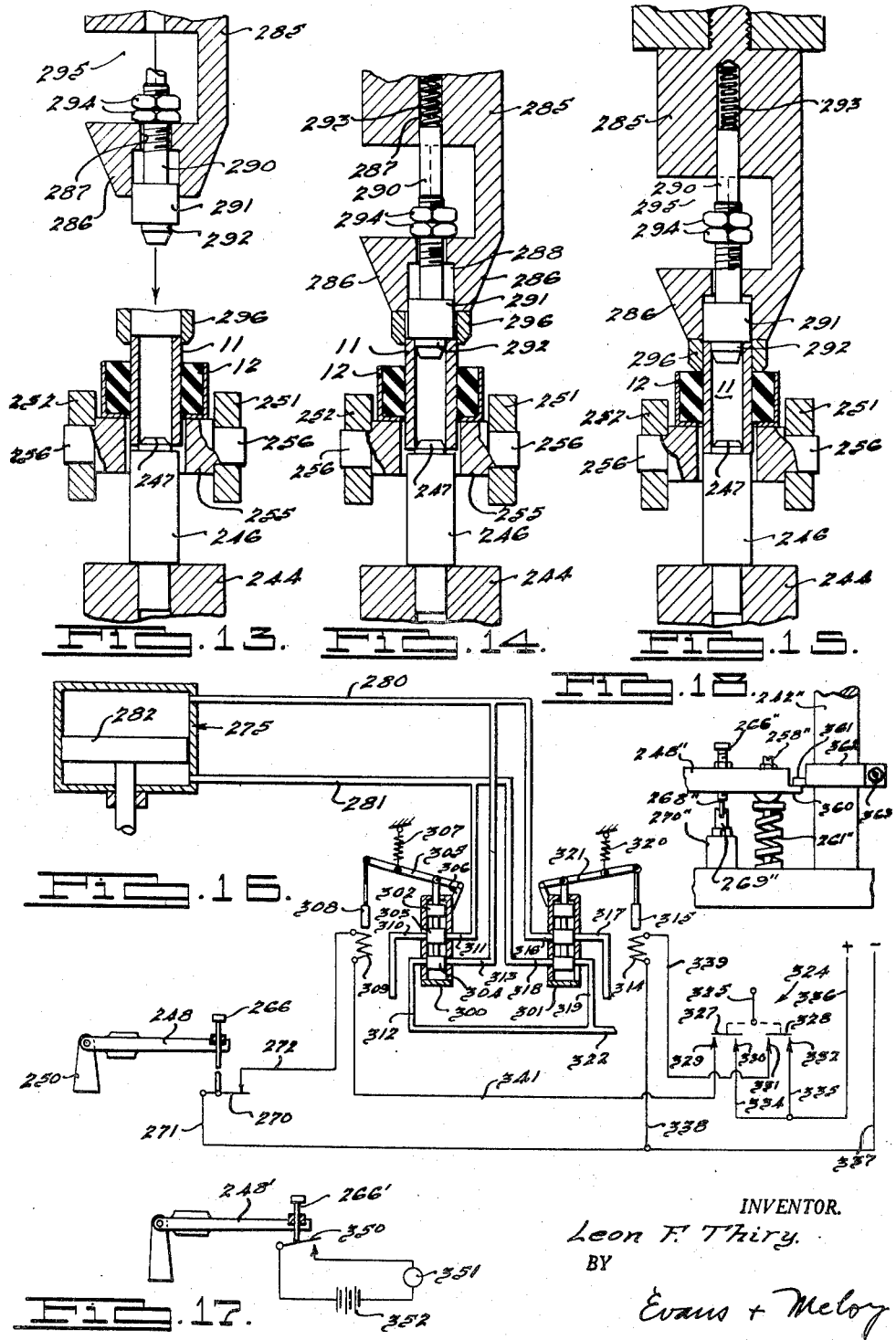
INVENTOR.
Leon F. Thiry.
BY
Evans + Meloy
ATTORNEYS.

United States Patent Office 2,785,458
Patented Mar. 19, 1957

2,785,458

APPARATUS FOR MAKING PRECISION ANTI-VIBRATION MOUNTINGS

Leon F. Thiry, Chagrin Falls, Ohio, assignor to The General Tire & Rubber Company, Akron, Ohio, a corporation of Ohio Original applications December 3, 1943, Serial No. 512,841, now Patent No. 2,446,621, dated August 10, 1948, and April 6, 1948, Serial No. 19,308, now Patent No. 2,641,053, dated June 9, 1953. Divided and this application April 22, 1953, Serial No. 350,357

4 Claims. (Cl. 29—235)

This application is a division of application Serial No. 19,308 filed April 6, 1948 now U. S. Patent No. 2,641,053 which was in turn a division of application Serial No. 512,841 filed December 3, 1943 and now U. S. Patent No. 2,446,621. The present invention relates to vibration mountings of the type employing a pair of relatively rigid members formed of metal, or the like, which are separated by a layer of rubber and in which the principal vibration is absorbed by relative movement between the rigid members in substantially parallel paths. Such mountings may comprise either a pair of spaced concentric members separated by an annular sleeve or ring of rubber or they may comprise two or more relatively flat plates separated by layers of rubber. The term "rubber" as used herein is intended to include both natural and synthetic rubber.

For many purposes it is essential to successful vibration dampening to employ vibration mountings having accurately calibrated deflection rates; that is to say, the amount of displacement of one of the members of the mounting with respect to the other for any given load must fall within narrow limits. The deflection characteristic of any given mounting is a function of many factors, including the size of the various parts, the thickness of the rubber layer and the hardness of the rubber. The deflection characteristic of mountings is also altered by the provision of flanges or bumpers adapted to engage the edge of the rubber layer and resist relative movement of the rigid members parallel to each other. It is also possible to change the deflection curve under various loads by altering the form and size of such a flange or bumper. While for any given installation all of these factors may be selected to produce a mounting of the desired characteristics, nevertheless in actual commercial production the tolerances permitted in the size of the parts, composition and hardness of the rubber and other factors result in a relatively wide variation in the deflection characteristics of mountings that are apparently of identical construction.

Accordingly, it is the general object of the present invention to provide apparatus for adjusting the deflection characteristics of vibration mountings after they are assembled in order to produce a mounting having the desired deflection rates.

More specifically, it is the object of the present invention to provide apparatus for producing a mounting having the desired deflection characteristics by permanently changing the location of one or more of the bumper flanges in the assembled mounting to a predetermined degree.

Other and more detailed objects and advantages of the invention will become apparent from the following specification, the drawings relating thereto and the claims hereinafter set forth.

In the drawings, in which like numerals relate to corresponding parts in the several views throughout:

Figures 1, 2 and 3 illustrate three slightly different types of vibration mountings of the concentric cylindrical sleeve type equipped with annular bumper flanges;

Figures 4, 5 and 6 illustrate three stages in the operation of press-fitting an annular bumper on the inner cylindrical sleeve of a mounting of the type shown in Figures 1, 2 and 3;

Figure 7 shows in fragmentary manner apparatus for determining the proper location of a press-fitted bumper element during the press-fitting operation;

Figure 8 shows a slightly different form of bumper construction, together with a die adapted to alter its form and location;

Figure 9 is a graph showing the manner in which the deflection groove of a mounting may be varied by varying the position of the bumper flanges;

Figure 10 is a side elevation with parts in section of a further modified form of apparatus for carrying out the method of the present invention;

Figure 11 is a fragmentary section taken on the line 11—11 of Figure 10;

Figure 12 is a horizontal section taken on the line 12—12 of Figure 10;

Figure 13, 14, and 15 are enlarged vertical section views of a portion of the machine in three different stages of the cycle of operation;

Figure 16 is a diagrammatic illustration of a suitable form of electromagnetically controlled hydraulic circuit for controlling the operation of the apparatus of Figure 10;

Figure 17 is a fragmentary diagrammatic illustration of a signaling circuit for use in connection with the machine of Figure 10;

Figure 18 is a fragmentary illustration showing a further modification of the mechanism illustrated in Figures 10 to 16.

In Figures 1 to 3 there is illustrated one form of vibration mounting to which the present invention is applicable, namely, a mounting comprising a pair of concentric members in the form of cylindrical sleeves separated by an annular ring of rubber. As shown in Figure 1, the annular rubber ring 10 is positioned between an inner sleeve 11 and an outer sleeve 12. The rubber is preferably held in position by a mechanical bond; that is to say, by the pressure induced by distorting a vulcanized ring of rubber which, in its free state, is of the form illustrated in the superimposed dotted outline 13 on Figure 1. The rubber ring is compressed radially and allowed to expand axially to the final assembled form illustrated in solid lines, and the tendency of the rubber to return to its initial form creates a strong mechanical bond between the rubber and the cylindrical sleeves. While this type of bond is preferred, it will be appreciated that the rubber ring may be bonded in the final form by vulcanization, if desired. In this type of vibration mounting, the principal freedom of movement between the sleeves is in an axial direction. In order to restrict relative axial movement between the two sleeves, it is customary to provide bumper rings, or flanges, such as the ring 14 press-fitted at the upper end of the inner sleeve 11 and the inturned flange 15 formed on the lower end of the outer sleeve 12.

In the mounting of Figure 1, the bumpers are provided only on the upper end of the inner sleeve and the lower end of the outer sleeve, inasmuch as the mounting is intended to act as a support for a member mounted on the inner sleeve and, consequently, the principal forces are acting in a downward direction on the inner sleeve and an upward direction on the outer sleeve. It will be appreciated that the bumper rings or flanges may both be formed in the manner of the flange 15 in Figure 1, or, as shown in Figure 2, the flange 15a on the outer sleeve may be formed as a press-fitted ring. Where the mounting is to sustain forces which act substantially equally in opposite directions, bumpers, such as the bumpers 14 and 15a in Figure 3, are provided on both ends of both sleeves.

Due to tolerances in the outside diameter of the inner sleeve, the inside diameter of the outer sleeve and in the size of the rubber ring in its free state, it is found that there are unavoidable variations in the axial extent of the distorted rubber ring 10 in the finally assembled mounting. These variations result in a variation between the deflection of different mountings under a given load. In addition, unavoidable and minor variations in the composition or hardness of rubber likewise result in different deflection rates for different mountings which are otherwise apparently identical.

In accordance with the present invention, these variations are corrected and a plurality of mountings having identical deflection characteristics is readily produced by adjusting the position of one or more of the bumper rings of the mounting after the rubber ring is inserted between the two sleeves. The effect of such adjustments is best illustrated in the chart, Figure 9, in conjunction with the fragmentary illustrations in Figures 4 to 6, inclusive.

Figure 9 shows a graph of axial force acting upon one of the sleeves plotted against the axial deflection of that sleeve with respect to the other sleeve. The axial deflection curve for any given mounting varies widely in form, depending upon the proportions of the various parts, but the curves illustrated in Figure 9 are generally representative of the nature of the changes in deflection rate that can be achieved by adjusting the position of the bumper rings. The lowermost curve 20 represents the deflection curve of a mounting of the type mentioned when no bumpers are employed. If after assembly a bumper ring, such as the ring 21 in Figure 4, is press-fitted on the inner sleeve 11 by means of the plunger 22 of a suitable press until the ring assumes the position shown in Figure 4, in which it is spaced slightly from the end of the rubber ring 10, the deflection curve for the mounting will be for a portion of its length identical to the mounting having no bumpers, but after the rubber contacts the bumper ring the resistance to deflection will increase, with the result that the deflection curve will assume a form somewhat like that shown at 24 in Figure 9.

By pressing the bumper ring 21 onto the inner sleeve until it just touches the rubber ring 10, as shown in Figure 5, a deflection curve represented by the line 25 in Figure 9 may be secured. The stiffness of the mounting may be further increased, with the result that it has a deflection curve such as that illustrated at 26 in Figure 9, by forcing the abutment ring 21 to a further extent onto the inner sleeve 11, as best shown in Figure 6. It will be apparent, therefore, that it is possible to increase or decrease the stiffness of any given mounting by adjusting the position of the bumper, as above described, over a much wider range than the unavoidable variations in stiffness which result from tolerances of manufacture.

The deflection resistance may be either increased or decreased, depending upon the direction in which the bumper is shifted, but, inasmuch as it is somewhat easier to move the bumper toward the rubber, it is preferred to design and construct the mountings to have resistance to deflection for their rated load slightly less than that desired in the final mounting. In such case, as a last step in the manufacture, one or more of the bumpers is adjusted in position to increase the stiffness of the mounting to the degree necessary to produce a mounting of the desired deflection characteristic.

For some purposes, where it is determined that the desired deflection characteristic can be achieved with the required accuracy by adjusting the flange until it just contacts the end of the rubber ring, it is possible to carry out the method in an ordinary hand-operated or manually controlled mechanical press which will force a press-fitted ring onto one of the mounting members until the desired relationship is achieved. The operator may, by inserting a very thin feeler gauge between the end of the rubber and the bumper, ascertain when the bumper has just contacted the rubber. If a slight space between the rubber and the bumper is desired, a feeler gauge of appropriate thickness can be employed and the pressing operation stopped when the bumper reaches the desired position.

In Figure 7 is illustrated a fixture for determining the proper location of a bumper particularly adapted for use in cases where the bumper is forced into the body of rubber, as indicated in Figure 6, to produce a stiffness represented by the line 26 on Figure 9. In Figure 7 numeral 30 represents the bed of an ordinary press having a plunger 31 adapted to force the abutment ring 32 onto the inner sleeve 11 of the mounting. Mounted on the bed 30 of the press is an upright post 33 having a hinged section 34 at its upper end, upon which is mounted a conventional form of dial indicator of the type commonly used for indicating minute dimensional variations. An arm 36 pivoted at 37 on the member 34 underlies the plunger 38 of the dial indicator and has a downwardly bent extremity carrying a button 39, which rests upon the upper end of the rubber ring 10 of the mounting. As a result of this arrangement, as the bumper ring 32 is forced downwardly beyond the point at which it first contacts the rubber ring 10 it will cause an upward flow or extrusion of the rubber in the manner illustrated in Figure 6, which will tend to lift the button 39 and lever 36, thereby raising the plunger 38 of the indicator and causing the pointer of the indicator to traverse the dial, thereby giving an indication of the amount which the upper end of the rubber ring has been elevated. By stopping the operation of the press after the rubber ring has been elevated by a predetermined amount, it is possible to obtain mountings of relatively uniform deflection characteristics.

The fixture illustrated in Figure 7 may also be employed in the same manner in connection with mountings in which the bumper is an integrally formed flange on one of the sleeves. Thus, in the case of such a mounting illustrated in Figure 8, the inwardly bent flange 42 on the inner sleeve 43 may be bent downwardly to a greater extent by means of a die 44 of appropriate shape which is mounted upon the plunger of the press. The die 44 has a stem 45 which will project entirely through the inner tubular member 43 before any deformation of the flange 42 occurs, thus preventing collapse of the inner tubular member, which is supported on a support 46. The operator, as in the case of the mechanism illustrated in Figure 7, will cause the die 44 to move downwardly until the upward extrusion of the rubber ring reaches the predetermined amount, as indicated by the dial indicator of Figure 7.

In Figures 10 to 16, inclusive, is illustrated a further modified form of apparatus for carrying out the invention of the present application. This form of mechanism is adapted for use on mountings in which the relative positions of the two rigid members of the mounting under no load conditions does not vary between different mountings. That is to say, in the case of mountings of the type illustrated in Figure 1 the apparatus is adapted for use where the lower end of the sleeve 11 and the lower end of the outer sleeve 12 are accurately held to a predetermined position with respect to each other measured axially of the mounting.

Referring to Figure 10, the apparatus comprises a bottom plate 240 and a top plate 241 connected by four bolts 242. The bottom plate is provided with an opening 243, in which is fitted a shouldered supporting member 244 having a central opening 245 passing therethrough. Fitted within the opening in its upper end and projecting upwardly from the member 244 is an arbor 246, which, as best shown in Figures 13 to 15, is adapted to engage the lower end of the inner sleeve 11 of a vibration mounting. The upper end of the arbor 246 has a reduced and tapered pilot 247 adapted to project within the sleeve 11 and thereby align the sleeve with the arbor. The pivoted arm 248 is pivoted on a pin 249 carried by an upstanding bracket 250 secured to the lower plate 240. The pivoted arm 248 is made up of a pair of bars 251 and 252, which are bolted together by a plurality of bolts 253 and are spread apart at 254 to receive an annular supporting ring 255, which is journaled on the arm 248 by a pair of trunnions 256, which project through suitable openings in the spread apart portions of the bars 251 and 252, as best shown in Figures 13 to 15.

At the extreme left-hand end of the arm 248, the bars 251 and 252 are again spread apart to embrace the upper end of the bracket 250, at which point the arm is pivoted to the bracket.

The annular supporting ring 255 is adapted to engage the lower end of the outer member 12 of the vibration mounting and thereby support the mounting. The right-hand end of the arm is provided with a set screw 258, which is threaded through the arm and carries at its lower end a rounded head 259, which bears upon a spring pad 260, which rests upon the upper end of a calibrated helical spring 261. The spring 261 at its opposite end seats against the lower plate 240 and is held in position by means of a pin 262, which is fitted within a suitable opening in the plate 240 and projects upwardly within the lower portion of the spring 261. The set screw 258 can be adjusted to change the position of the arm with respect to the spring 261 for a given load acting on the spring, and the set screw may be locked in position by means of a lock nut 263.

As best shown in Figure 11, an angle bracket 265 is secured to the rear side of the arm 248 and an adjusting screw 266 is threaded through the upper horizontal leg of the bracket 265 and is adapted to be locked in its adjusted position by means of a lock nut 267. The lower end of the adjusting screw 266 is adapted to engage a roller 268 carried by the plunger 269 of any suitable or conventional form of microswitch 270, which is adapted to control an electrical connection between a pair of wires 271 and 272. The detailed construction of microswitch 270 forms no part of the present invention, it being sufficient to state that it is of such character that upon a very minute downward movement of the plunger 269 the electrical connection between the lines 271 and 272 will be broken. Such switches are available in which the operative movement of the plunger is in the order of a few thousandths of an inch, or less. It is apparent, therefore, that with the construction so far described the circuit between the lines 271 and 272 will be broken when the arm 248 swings downwardly to a predetermined position, depending upon the adjustment of the screw 266.

The upper plate 241 carries a hydraulic cylinder 275, which is formed of a cylindrical barrel 276 and a pair of cylinder heads 277 and 278 held together by a plurality of bolts 279. A pair of pipes 280 and 281 leads to the upper and lower ends of the cylinder, respectively. Positioned within the cylinder is a piston 282 having a piston rod 283 which projects through a suitable packing gland, indicated generally at 284, secured to the lower cylinder head 278, the upper plate 241 being provided with an opening of suitable proportions to permit the packing gland to project through the plate. Mounted on the lower end of the piston rod 283 is a head 285, having a tapered lower nose portion 286 and a central bore 287, which is provided with an enlarged counterbore 288 at the lower end of the head.

A plunger 290 is mounted within the bore 287 and is provided with an enlarged head 291, which slides within and fits the counterbore 288. The lower end of the head 291 is provided with a reduced pilot portion 292 having a tapered end to facilitate its entry into the upper end of the inner sleeve 11 of the mounting in order to align the mounting with the head 286.

Plunger 290 is normally pressed downwardly to the position shown best in Figure 14 by means of a coil spring 293 positioned in the upper end of the bore 287. The plunger 290 is provided with a threaded portion intermediate its ends, which is adapted to pass freely through the lower portion of the bore 287 and which is adapted to receive a pair of lock nuts 294 for limiting downward movement of the plunger 290 with respect to the head 285 under the influence of the spring 293. The head 285 is provided with a transversely extending recess 295 which intersects the bore 287 intermediate its ends in order to provide a cavity within which the lock nuts 294 are located of sufficient size to permit the use of a wrench to tighten or adjust the nuts.

It will be noted that the lower end of the head 285 is adapted to engage the upper end of the annular abutment ring 296, the head 285 being so constructed that it is necessary to start the press-fitting of the abutment ring 296 upon the inner sleeve 11 before the mounting is placed within the machine of Figures 10 to 16. It will be obvious, however, that if it is desired to start the press-fitting operation of the ring 296 in the machine, it is only necessary to provide a retaining device for the ring 296 on the lower end of the head 285.

The operation of the apparatus so far described is as follows. The vibration mounting is inserted in the machine by resting it upon the supporting ring 255 in the manner illustrated best in Figure 13. At this time, the spring 251 is in its unloaded position, in which it is shifted by arm 248 to its uppermost position, in which the space between the lower end of the sleeve 11 of the vibration mounting and the upper end of the arbor 246, as best shown in Figure 13, is either equal to or slightly exceeds the desired deflection of the mounting under a rated axial load, the distance being controlled by proper selection of the length of the arbor 246.

In addition, the adjusting screw 266 is so adjusted in its bracket 265 that it engages and actuates the microswitch 270 when sleeve 11 is seated against arbor 246 and the relative axial displacement between the sleeve 11 and the outer sleeve 12 of the mounting is equal to the desired deflection at rated axial load. The spring 261 is likewise so chosen or adjusted that when the adjusting screw 266 actuates the microswitch 270 the spring 261 exerts, through arm 248, the rated axial load in an upward direction on the outer sleeve 12.

Once the adjustments are made, the machine is in condition for use and operation of the machine merely requires the admission of hydraulic pressure to the upper end of cylinder 275 to start the downward movement of the head 285. This movement presses the bumper or abutment ring 296 onto the inner sleeve. The force required to press the ring on the sleeve forces the inner sleeve downwardly against the upper end of the arbor 246 and thus deflects the two sleeves of the mounting relative to each other and applies a reacting force through the rubber ring 10 and the outer sleeve 12 on the arm 248. As the press-fitting operation continues, the abutment ring 296 engages the rubber ring and progressively increases the deflection resistance of the mounting.

This increase in the deflection resistance of the mounting increases the force exerted on the arm 248 by the outer sleeve 12 and eventually increases the force to such a point that the arm, through adjusting screw 266, actuates the microswitch 270. The microswitch 270, through means hereinafter described, automatically stops the press, thus producing a mounting of exactly the desired deflection characteristic. Subsequent mountings may then be placed in the machine and the cycle repeated without any further adjustments.

The means associated with the microswitch 270 for automatically stopping the press-fitting operation is best shown in the electrohydraulic circuit diagram of Figure 16. As there shown, there is provided a pair of dual electromagnetically operating shut-off valves, illustrated diagrammatically at 300 and 301. The two valves are identical and a description of one will suffice.

As shown, the valve 300 contains a spool having three lands 302, 303 and 304, the spool being normally held in the position illustrated by means of a lever 305 pivoted to a fixed bracket 306 and to the end of the spool and urged upwardly by a spring 307. The free end of the lever is connected in any suitable manner to an armature 308 of an electromagnet having a coil 309. In the position of the valve illustrated, the spool 303 blocks communication between a pair of lines 310 and 311, while spool 304 blocks communication between a pair of arms 312 and 313. Upon energization of the electromagnet, the armature or core 308 will be pulled downwardly, thereby shifting the spool downwardly and opening communication between lines 310 and 311 and also opening communication between lines 312 and 313.

Valve 301 is similar in construction and employs an electromagnetic coil 314 having an armature or core 315. In the closed position illustrated, valve 301 blocks all flow therethrough, but when the spool is shifted downwardly it opens communication between a pair of lines 316 and 317 and also between a pair of lines 318 and 319. The valve is normally held in closed position by the spring 320, which is connected with lever 321. Lines 312 and 319 are joined together and connected by means of a line 322 to any suitable source of hydraulic pressure, while lines 310 to 317 are connected to a low pressure reservoir or tank. Lines 316 and 313 are connected to the line 280 which leads to the upper end of cylinder 275, while lines 311 and 318 are connected to line 281, which leads to the lower end of the cylinder 275.

As the result of this arrangement, energization of the coil 309 opens valve 300 and admits fluid under pressure to the upper end of cylinder 275, while at the same time connecting the lower end of the cylinder through lines 281 and 311 through the valve in line 310 to the low pressure reservoir or tank.

When valve 300 is thus opened, it will be understood that valve 301 will remain closed, as illustrated. Conversely, when valve 300 is closed and valve 301 is opened by energization of the coil 313, fluid under pressure will be admitted to the lower end of cylinder 305 and the upper end of the cylinder will be connected to the low pressure tank or reservoir.

Suitable means are provided, including a switch indicated diagrammatically at 324, for selectively energizing the coils 309 and 314. Switch 324 includes an operating handle 325 adapted to be actuated by the operator in either of two pivotal directions. The handle carries, by any suitable means, a pair of contacting bars 327 and 328, bar 327 being adapted to engage and electrically connect a pair of contacts 329 and 330, while bar 328 is similarly adapted to engage and electrically connect a pair of contacts 331 and 332. In the normal position of the switch 324, as illustrated, both of the bars 327 and 328 are out of engagement with the contacts and, consequently, both circuits through the switch are open.

Contacts 330 and 332 are connected by lines 334 and 335 to a line 336, which, in turn, is connected to one side of a suitable source of electric current, not shown. A line 337, which is similarly connected to the opposite side of the source of electric current, is connected by means of a line 338 to the coil 314 and a line 339 to the contact 331, and the line 337 is also connected by means of the line 271, the microswitch 270, line 272, coil 309 and line 341 to the contact 329.

It will be apparent from the above that when the handle 325 of switch 324 is shifted in a counterclockwise direction, as viewed in the drawing, it will energize coil 309 by closing a circuit through lines 336 and 334, contact 330, bar 327, contact 339, line 341, coil 309, line 272, microswitch 270 and line 271 to the return line 337. This will result in the opening of valve 300 and the admission of fluid under pressure to the upper end of the cylinder to start the press-fitting operation. The downward movement of the piston 282 in cylinder 275 will continue until the circuit to coil 309 is broken by opening the microswitch 270, which opening of the microswitch is effected by actuation of arm 248 of the mechanism illustrated in Figure 10, as previously described.

As soon as the circuit is broken at the microswitch, spring 307 will return the spool of valve 300 to the closed position illustrated and the press will stop. Thereupon, the operator may shift the handle 324 in a clockwise direction to open the circuit between contacts 329 and 330 and close the circuit between contacts 331 and 332. When the latter circuit is closed, coil 314 is energized by connection from line 336 through line 335, contact 332, bar 328, contact 331, line 339, coil 314, line 338 and return line 337, thus opening valve 301 and effecting the return movement of piston 282.

It is apparent, therefore, that there is provided in accordance with Figures 10 to 16 an exceedingly simple mechanism for adjusting the bumper on a vibration mounting incorporating automatic means for stopping the bumper moving operation when the mounting has exactly the desired deflection characteristic. As previously indicated in connection with earlier modification, the mechanism of Figures 10 to 16 may be equally well adapted to shift the position of an integral bumper flange on either of the rigid members of the mounting.

If a more simplified control mechanism is desired, it is apparent that in the apparatus of Figures 10 to 16 there may be employed a pair of manually controlled valves corresponding to the valves 300 and 301 or a single manually controlled four-way valve of conventional construction, provided suitable means are incorporated in the machine to indicate to the operator when the mounting has the desired deflection characteristic. Accordingly, there is illustrated in Figure 17 a simple incandescent lamp signaling circuit which is energized by means of the closing of a microswitch 350 by means of the adjusting screw 266' on an arm 248', which corresponds to the arm 248 of Figure 10.

Microswitch 350 is incorporated in a circuit including a suitable signaling lamp 351 and any suitable source of electric energy, such as that indicated diagrammatically at 352. In this case, when the mounting reaches the desired deflection characteristic the arm 248' will be actuated in the manner previously described to close the lamp circuit and thus light the lamp and indicate to the operator that the press should be stopped. The remaining portions of the mechanism will, of course, be identical to those illustrated in connection with Figures 10 to 15.

The manner of making the adjustments and the mode of operation of the member may be modified and somewhat simplified if desired, by incorporating a fixed stop to limit upward movement of the arm 248 of Figure 10 to that position in which the axial displacement between the members 11 and 12 of the mounting during the press-fitting operation is equal to the desired deflection at rated loads, and such an arrangement is illustrated in the fragmentary illustration of Figure 18. As there shown, the arm 248", which corresponds to the arm 248 of Figure 10, is identical in construction to arm 248 and carries a similar set screw 258" for adjusting the tension of the spring 261". It also carries a similar adjusting screw 266" for actuating the microswitch 270". In addition to the above features, which are identical to those of Figure 10, the extremity of the arm 248" is provided with a projection 260, which is adapted to engage a projection 261 on a split clamping ring 362, which is clamped around the bolt 242", which corresponds to one of the bolts 242 of Figure 10. The split clamping ring 362 is held in any desired vertically adjusted position by means of a bolt 363 extending through ears on the split clamping ring 362, in the usual manner.

All of the remaining features of the machine may be identical to those illustrated in Figures 10 to 16, or, if desired, they may incorporate the indicating circuit of Figure 17 in place of the automatic shut-off circuit of Figure 16.

When operating the mechanism of Figure 24, the split clamping ring 362 is adjusted vertically on the bolt 242 until it limits the upward movement of the arm 248" to a position in which the initial gap between the lower end of the inner sleeve 11 and the upper end of the arbor 246 (see Figure 13) is exactly equal to the desired deflection at rated load and the adjusting screw 266" is adjusted to a position in which it just contacts the roller 268" on the stem 269" of the microswitch 270". In addition, the set screw 258" is so adjusted that, or the spring 261" is so selected that, the upward pressure exerted by the spring 261" on the arm 248" when the projection 360 of the arm engages the stop 361, when divided by the mechanical advantage provided by arm 248", exactly equals the rated load for the mounting.

In this case, it will be apparent that as soon as the downward force exerted by the outer sleeve 12 upon the supporting ring 255 exceeds by a minute amount the rated load of the mounting for the then existing rated axial deflection, the arm 248" will move away from the stop 361 and will actuate the microswitch 270" and thereby effect a stoppage of the press-fitting operation. The actual movement of the arm 248" necessary to operate the microswitch 270" is so small that the increase in deflection resistance necessary to cause it is negligible and, consequently, the press will be stopped when the vibration mounting has the desired deflection characteristic.

The calibrated spring 261 of Figure 10 or 261" of Figure 18 may, of course, be replaced by other spring or weight arrangements. It is only necessary that some means be provided for exerting a known or measurable force on the lever arm. In the case of weights, the force is easily ascertained and is relatively independent of the position of the arm. When a calibrated spring is used the force varies with the position of the arm, but the rate of variation is known and hence the force for any position of the arm is also known.

It is apparent that there is provided in accordance with the present invention simple and practical methods and apparatus for producing vibration mountings of accurately calibrated deflection characteristics. While the invention is illustrated and described in connection with mountings of the type employing a pair of concentric rigid members, it will be appreciated that the principles of the invention are equally applicable to any type of vibration mounting incorporating a pair of rigid members separated by a layer of resilient rubber.

It is apparent, further, that while several mechanisms are illustrated and described, further modifications of the mechanisms are available within the spirit of the invention and the scope of the appended claims.

What I claim is:

1. An apparatus for positioning a bumper on one of the members of a vibration mounting of the type consisting of inner and outer concentric radially spaced members separated by an annular ring of rubber to produce a mounting having a predetermined deflection for a given load comprising a frame, a substantially horizontal lever pivotally mounted adjacent one end thereof and provided with an opening intermediate its ends, a compression spring mounted adjacent the other end of said lever and between said lever and said frame, a plate horizontally pivoted in said opening on said lever with the pivot axis of said plate being parallel to the pivot axis of said lever, said plate being adapted to support the outer concentric member and provided with a central opening, a supporting element on one side of said plate in alignment with the central opening of said plate and providing support for the inner concentric member, a plunger on the other side of said plate for clamping the inner concentric member against the supporting element, a reciprocable member outside of said plunger for progressively moving a bumper axially on one of the concentric members and against the annular ring of rubber, means for operating said reciprocable member, said reciprocable member acting on said bumper and in turn said lever in a direction in opposition to said compression spring, said plunger being movable relative to said reciprocable member, a switch mounted on said frame on the side of the plate opposite from the pivot point of said lever and adapted to be actuated when said lever compresses said spring to a predetermined amount, and connecting means between said switch and said reciprocable member to stop said reciprocable member when said switch is actuated.

2. An apparatus for positioning a bumper on one of the members of a vibration mounting of the type consisting of inner and outer concentric radially spaced members separated by an annular ring of rubber to produce a mounting having a predetermined deflection for a given load comprising a frame, a lever pivotally mounted adjacent one end thereof and provided with an opening intermediate its ends, a source of known force adjacent the other end of said lever, a plate pivoted in said opening on said lever with the pivot axis of said plate being parallel to the pivot axis of said lever, said plate being adapted to support the outer concentric member and provided with a central opening, a supporting element on one side of said plate in alignment with the central opening of said plate and providing support for the inner concentric member, a plunger on the other side of said plate for clamping the inner concentric member against the supporting element, a reciprocable member outside of said plunger for progressively moving a bumper axially on one of the concentric members and against the annular ring of rubber, means for operating said reciprocable member, said reciprocable member acting on said bumper and in turn said lever in a direction in opposition to said source of known force, said plunger being movable relative to said reciprocable member, a switch mounted on said frame on the side of the plate opposite from the pivot point of said lever and adapted to be actuated when said lever acts against said source of known force to a predetermined amount, and connecting means between said switch and said reciprocable member to stop said reciprocable member when said switch is actuated.

3. The apparatus of claim 2 in which said lever is provided with adjustable contact means for contacting said switch.

4. An apparatus for positioning a bumper flange on one of the members of a vibration mounting of the type consisting of inner and outer concentric radially spaced members separated by an annular ring of rubber to produce a mounting having a predetermined deflection for a given load comprising a frame, a substantially horizontal lever pivotally mounted adjacent one end thereof and provided with an opening intermediate its ends, a compression spring mounted adjacent the other end of said lever and between said lever and said frame, a plate horizontally pivoted in said opening on said lever with the pivot axis of said plate being parallel to the pivot axis of said lever, said plate being adapted to support the outer concentric member and provided with a central opening, a supporting element on one side of said plate in alignment with the central opening of said plate and providing support for the inner concentric member, a plunger on the other side of said plate for clamping the inner concentric member against the supporting element, a reciprocable member outside of said plunger for progressively moving a bumper flange axially on one of the concentric members and against the annular ring of rubber, means for operating said reciprocable member, said reciprocable member acting on said bumper flange and in turn said lever in a direction in opposition to said compression spring and being provided with a die for engaging said bumper flange, said plunger being movable relative to said reciprocable member, a switch mounted on said frame on the side of the plate opposite from the pivot point of said lever and adapted to be actuated when said lever compresses said spring to a predetermined amount, connecting means between said switch and said reciprocable member to stop said reciprocable member when said switch is actuated, and a stop mounted on said frame for preventing extreme rotation of said lever about its pivot point.

References Cited in the file of this patent
UNITED STATES PATENTS

| | | |
|---|---|---|
| 2,126,377 | Fear et al. | Aug. 9, 1938 |
| 2,236,158 | Rockefeller | Mar. 25, 1941 |
| 2,641,053 | Thiry | June 9, 1953 |